United States Patent [19]
Hau et al.

[11] Patent Number: 5,528,301
[45] Date of Patent: Jun. 18, 1996

[54] UNIVERSAL VIDEO FORMAT SAMPLE SIZE CONVERTER

[75] Inventors: Clarence J.-Y. Hau, Mt. Laurel; Kevin J. Stec, Medford, both of N.J.

[73] Assignee: Panasonic Technologies, Inc., Princeton, N.J.

[21] Appl. No.: 414,910

[22] Filed: Mar. 31, 1995

[51] Int. Cl.⁶ .................................................. H04N 7/01
[52] U.S. Cl. ........................ 348/441; 364/724.1; 348/571; 382/260
[58] Field of Search .................................. 348/441, 571, 348/607, 625; 382/260; 364/724.1; H04N 7/01

[56] References Cited

U.S. PATENT DOCUMENTS

| | | |
|---|---|---|
| 3,997,272 | 12/1976 | Crochiere et al. ............... 364/724.1 |
| 4,468,688 | 8/1984 | Gabriel et al. . |
| 4,472,732 | 9/1984 | Bennett et al. . |
| 4,472,785 | 9/1984 | Kasuga ............................... 364/724.1 |
| 4,631,750 | 12/1986 | Gabriel et al. . |
| 4,652,908 | 3/1987 | Fling et al. . |
| 4,774,581 | 9/1988 | Shiratsuchi . |
| 4,908,874 | 3/1990 | Gabriel . |
| 5,057,911 | 10/1991 | Stec et al. . |
| 5,274,372 | 12/1993 | Luthra et al. ...................... 348/441 |
| 5,327,235 | 2/1994 | Richards ............................ 348/441 |
| 5,331,346 | 7/1994 | Shields et al. . |
| 5,389,923 | 2/1995 | Iwata et al. ........................ 438/441 |
| 5,481,568 | 1/1996 | Yada ................................. 364/724.1 |
| 5,483,474 | 1/1996 | Arbeiter et al. .................. 364/724.1 |
| 5,489,903 | 2/1996 | Wilson et al. ................... 364/724.1 |

Primary Examiner—Victor R. Kostak
Attorney, Agent, or Firm—Ratner & Prestia

[57] ABSTRACT

A system and method for converting a first digital input signal having a first sample size per unit length and a first bandwidth to a digital output signal having a second sample size per unit length. The input signal is passed through a first filter means which decimates the signal to a smaller sample size and outputs a decimated signal. A second filter limits that bandwidth of the decimated signal and outputs a band-limited signal. Next, a third filter interpolates the bandlimited signal to produce a digital output signal having the desired sample size.

9 Claims, 10 Drawing Sheets

UNIVERSAL VIDEO FORMAT SAMPLE SIZE CONVERTER

FIELD OF THE INVENTION

The present invention relates to digital resampling, and in particular, to a digital resampling system for converting from one video/television format to another video/television format.

BACKGROUND OF THE INVENTION

There are numerous television and video digital signal sampling rate standards. For example, a sample rate of 13.5 MHz is compatible with the 4:2:2 Component Digital Standard (CCIR 601). Sampling at this rate produces 720 active video samples per linearized line on a standard television tube as is also referred to as standard definition television (SDTV). SDTV displays 525 lines per image frame in interlaced mode. High Definition Television (HDTV) has not yet been standardized, but may sample in the range 72 MHz to 81 MHz. The International Radio Consultative Committee, CCIR, has proposed a sample rate of 1920 samples (pixels) per line for HDTV. One HDTV standard can display 1125 lines of resolution per image frame, as compared to the 525 lines of standard definition television. Other television standard exist, such as the D2-MAC, PAL and SECAM standards, in Europe and the Wide Screen Television (WST) standard.

With the many standards in existence, it is desirable to be able to convert from one standard to another, such as for the display of a television/video signal recorded in one standard format on a television set designed for display of a different standard format.

In some instances, this is referred to as video resizing. For example, video resizing allows a full length motion picture film (start on 35 mm, 24 frame film) having a 16 by 9 aspect ratio to be displayed on an NTSC television set without having to "letter box" the output display. In the digital domain, video resizing requires that the input signal be digitally resampled.

Digital resampling produces a different representation of the digital input signal by calculating points of the signal that did not necessarily exist in the original signal. New samples are generated in locations which did not previously have samples through an interpolation technique. A flexible interpolation filtering architecture is capable of resizing a video/television line to an arbitrary size. An example of video resizing is described in U.S. Pat. No. 08/317,474 issued Nov. 4, 1994, entitled FILTER SELECTION CIRCUIT FOR DIGITAL RESAMPLING SYSTEM, which is incorporated by reference herein.

Another example of video resizing takes place in picture-in-picture television displays. U.S. Pat. No. 4,652,908 issued Mar. 24, 1987 entitled FILTERING SYSTEM FOR PROCESSING A REDUCED RESOLUTION VIDEO IMAGE, describes a system for video signal processing to produce a reduced size image for display inside of a larger image television screen. This system involves a reduction of the signal to an already known, smaller picture size.

SUMMARY OF THE INVENTION

The present invention comprises a system and method for converting a signal from one video format to another by taking a first digital input signal having a first sample size per unit length and a first bandwidth to a digital output signal having a second sample size per unit length. The input signal is passed through a first filter means which optionally decimates the signal to a smaller sample size and outputs a decimated filter output signal. A second filter optionally limits the bandwidth of the decimated filter output signal and outputs a bandlimited filter output signal. Next, a third filter interpolates the bandlimited output filter signal to a digital output signal having the desired sample size.

BRIEF DESCRIPTION OF THE FIGURES

The invention will be described by way of non-limiting example, with reference to the attached drawings in which.

DETAILED DESCRIPTION

Figure 1:
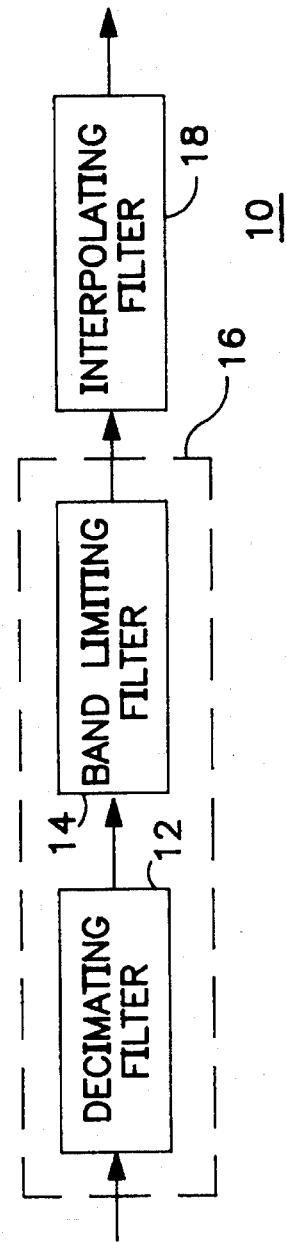
FIG. 1 is block diagram of a three filter video resizing system in accordance with an exemplary embodiment of the present invention.

FIG. 1 shows an exemplary video resizing system 10 in accordance with the present invention. System 10 is a digital filter system which takes digital signal information corresponding to a television/video signal as one input signal in one sample format and outputs digital signal information in a sample format different than the input signal format. System 10 is a one dimensional filtering system which can operate on either horizontal or vertical input signals. For the embodiments described herein, the input signal information is described as horizontal, i.e. a specific number of samples per linearized line of television/video signal information. Although described in terms of horizontal signal information, the invention as illustrated by the embodiments described herein is equally applicable to video resizing of vertical signal information. For such an application, successive samples representing vertical columns are applied to the filter in place of the horizontal line information.

System 10 is not designed for a specific video resizing format conversion, but rather is designed as a flexible interpolation filtering architecture capable of resizing any video line format to an arbitrary size. The resizing is carried out in the digital domain without conversion of digital signals into analog signals for processing.

Video resizing in accordance with the present invention is divided into three areas or conversion regions. The first is upsampling, where the input digital sample is converted into a digital sample format having a higher sampling rate. An example is going from a standard definition television (i.e. 720 samples per line) to high definition television (i.e. 1920 samples per line). The second is downsampling, where the ratio of the samples per line of the input signal information to the desired samples per line of the output signal information is greater than 0.5 and less than 1.0. An example of downsampling is converting from wide screen television (16 by 9 aspect ratio having 960 samples per line) to standard definition television (4 by 3 aspect ratio i.e. 720 samples per line). Finally, the third area is decimating, where the ratio of input sample to output sample format is less than or equal to 0.5. An example of decimating is converting from high definition television (i.e. 1920 samples per line) to standard definition television (i.e. 720 samples per line).

System 10 includes 3 filters. The three filters are decimating filter 12, bandlimiting filter 14 and interpolating filter 18. Decimating filter 12 and bandlimiting filter 14 may be combined in a single integrated circuit chip, illustrated as block 16. Additional bandlimiting can occur prior to decimating.

In upsampling mode, decimating filter 12 and bandlimiting filter 14 do not filter input data, instead they operate as "all pass" filters. This is because interpolating filter 18 is sufficient for upsampling input data to a higher sample format without the need for bandlimiting. Interpolating filter 18 can then be programmed to generate the additional samples required by the higher output sample rate format.

In downsampling mode, decimating filter 12 does not filter the input sample data (i.e. acts as an all pass filter), because the bandwidth of the higher input sample data is not too high for the lower sampling format. If a digital signal is simply down sampled without bandlimiting, the result will be aliased. Therefore, its is necessary to band limit the input signal prior to downsampling. Accordingly, bandlimiting filter 14 serves to reduce the bandwidth of the input signal prior to downsampling by interpolating filter 18.

Bandlimiting filter 14 can be a Finite Impulse Response (FIR) filter that can select among a bank of filter coefficients which are determined by a scaling factor. The scaling factor is the ratio of the input sample rate to the output sample rate. Bandlimiting filter 14 reduces the bandwidth of the input signal enough to prevent aliasing from taking place in interpolating filter 18.

The third mode requires decimating. If the scaling factor is less than 0.5, the quality of the conversion from the higher input sample rate format to the lower output sample rate format can be adversely affected, because bandlimiting filter 14 may not be able to sufficiently reduce the bandwidth prior to interpolation. When the scaling factor is less than 0.5, decimating filter 12 decimates the input data by an integer amount in an exemplary embodiment. In an exemplary embodiment, decimating filter 12 may be, for example, a Harris HSP43168 integrated circuit. This particular decimating filter decimates the input data by a factor of 2, 4 or 8. Further decimations are fully within the description of the invention, requiring a different integrated circuit and/or additional circuitry, as would be understood by those skilled in that art. For instance, two Harris HSP43168 chips could be used in series to increase the decimating factors. Referring back to the embodiment shown in FIG. 1, the input sample can be decimated by ½, ¼ or ⅛, of its original sample rate, prior to entering bandlimiting filter 14, to further reduce the band width. The Harris filter is also capable of simple FIR filtering operations to provide bandlimiting for upsampling and downsampling modes, acting as a combined decimating filter and bandlimiting filter 16.

If an input signal having a sample rate of 1920 samples per line were to be resized to an SDTV sample format of 720 samples per line, decimating mode (mode 3) for system 10 would be required. The input signal of 1920 samples per line enters decimating filter 12 where a decimation of ½ (decimating factor of 2) takes place. This results in every other sample being thrown out, i.e. only half the signals of the input signal are used. Two is the largest integer which can be divided into 1920 and yield a result which is greater than or equal to the desired output sample rate of 720. The decimated signal of 960 samples then enters bandlimiting filter 14 where the bandwidth of the signal is reduced. The 960 sample signal reduced bandwidth signal then enters interpolating filter 18 where a downsizing interpolation takes place, converting the 960 samples to 720 samples. The 720 samples are then output from interpolating filter 18.

Figure 2:
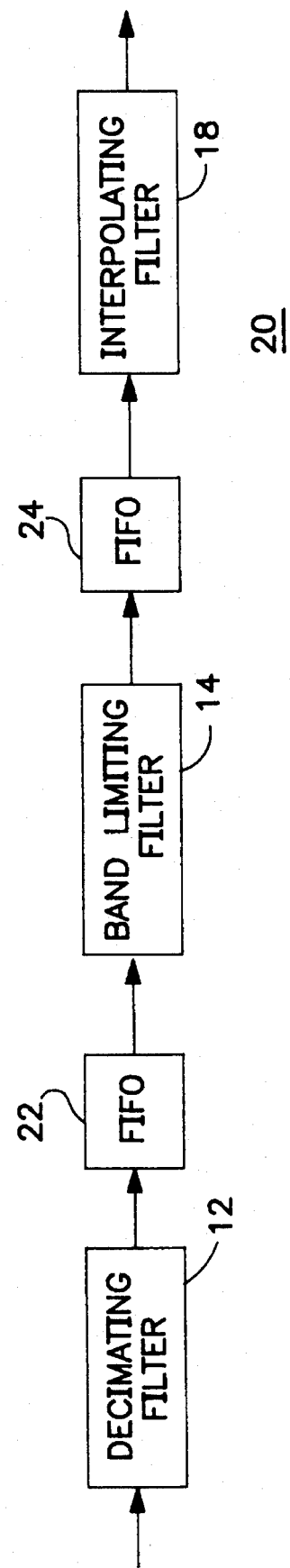
FIG. 2 is a block diagram of the video resizing system shown in FIG. 1 with the inclusion of FIFO memory buffers.

There is shown in FIG. 2 a video resizing system 20. Video resizing system 20 takes the three filter components of system 10 and adds a FIFO memory buffer 22 between decimating filter 12 and bandlimiting filter 14 and a FIFO memory buffer 24 between bandlimiting filter 14 and interpolating filter 18. FIFO memories 22 and 24 are line buffers (first in first out memory circuits). FIFOs 22 and 24 hold data prior to entry into the next circuit phase. For example, in decimating mode using a scaling factor of 2, decimating filter 12 writes every other sample into FIFO 22. Bandlimiting filter 14 then reads every sample out of FIFO 22 (960 samples total) when performing its bandlimiting operations. Without FIFO 22, bandlimiting filter 14 would operate on every other input sample (assuming a decimating factor of 2) requiring bandlimiting filter 14 to constantly stop and start its operation. FIFO 22 allows a constant operation of bandlimiting filter 14.

An example operation of system 20 illustrated as three lines through the three modes described above is shown in FIGS. 4A, 4B and 4C.

Figure 4A:
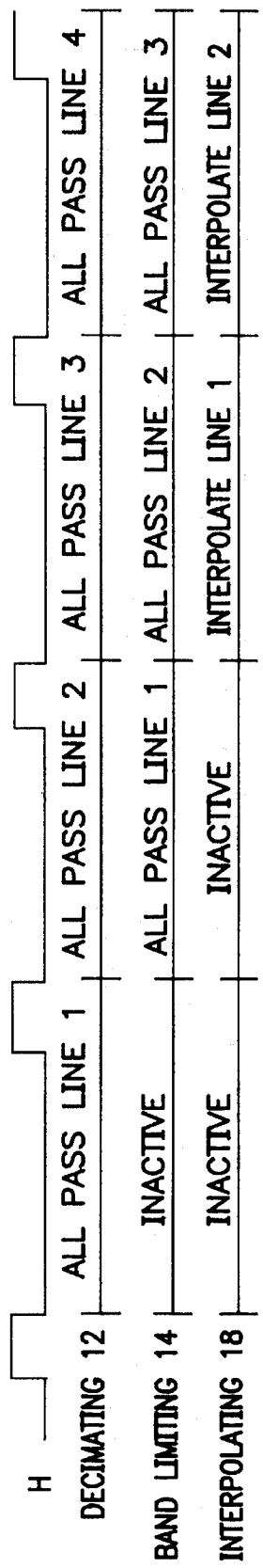
FIGS. 4A, 4B and 4C are timing diagrams which are useful for describing the operation of the exemplary embodiment of a video resizing system in accordance with the present invention shown in FIG. 2.

FIG. 4A shows system 20 operating in upsampling mode. The operation of decimating filter 12, bandlimiting filter 16 and interpolating filter 18 are shown in time sequence against a horizontal sync pulse H. As the first line of input data enters decimating filter 12 of system 20, decimating filter 12 acts as an all pass filter while bandlimiting filter 14 and interpolating filter 18 are inactive, because no data has as yet reached these filters. During the second cycle, decimating filter 12 and bandlimiting filter 18 both act as all pass filters while interpolating filter 18 is still inactive. During the third cycle, decimating filter 12 and bandlimiting filter 14 still act as all pass filters while interpolating filter 18 interpolates input data corresponding to the first line of video information. During the fourth cycle, decimating filter 12 and bandlimiting filter 14 act as all pass filters and interpolating filter 18 interpolates the second line of video information. This continues for each line of video information input into system 20.

Figure 4B:
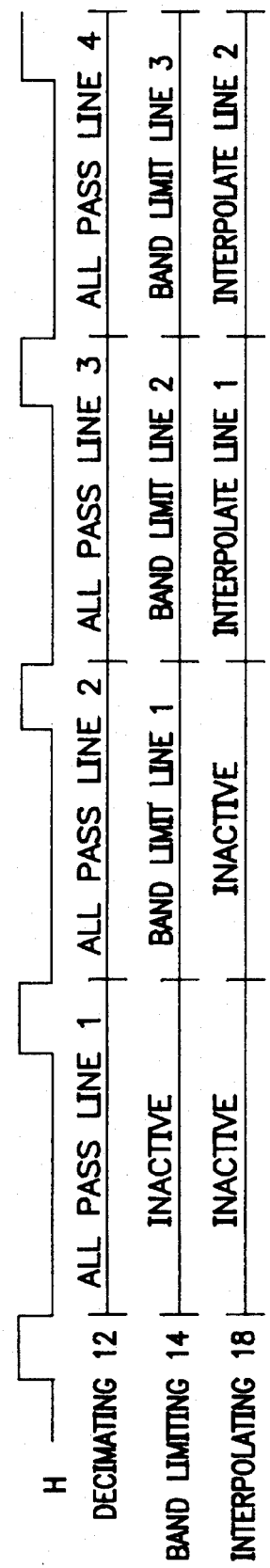

In FIG. 4B, the downsampling mode of operation of system 20 is illustrated in time line format. During the first cycle of the horizontal sync pulse, decimating filter 12 acts as an all pass filter while bandlimiting filter 14 and interpolating filter 18 are inactive. During the second cycle, decimating filter 12 acts as an all pass filter while bandlimiting filter 14 band limits the first line of information. Interpolating filter 18 is still inactive during this second cycle. During the third cycle, decimating filter 12 still acts as an all pass filter while bandlimiting filter 14 limits the band width of the second line of data. Data for line one has now reached interpolating filter 18 where an interpolation for downsampling takes place. During the fourth cycle, decimating filter 12 acts as an all pass filter while bandlimiting filter 14 limits the band width of the third line of input data. Interpolating filter 18 interpolates the interpolating second line of input data.

Figure 4C:
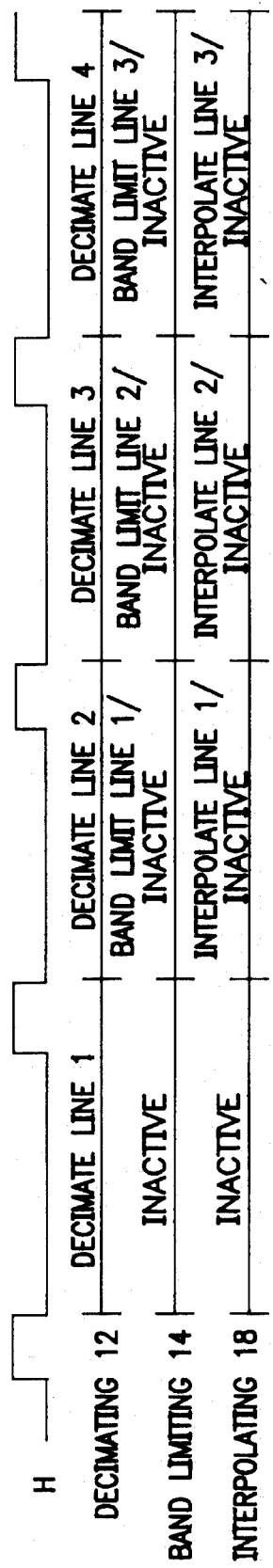

FIG. 4C illustrates the operation of the decimating mode of system 20 in a time line format. During the first cycle, decimating filter 12 decimates the line one information. In going from 1920 samples to an ultimate output of 720 samples, a scaling factor of 2 is used cutting the input sample in half. During the first horizontal line interval, bandlimiting filter 14 and interpolating filter 18 are inactive. In the second line interval, decimating filter 12 decimates the second line of information. Bandlimiting filter 14 bandlimits the first line of information during the first half of horizontal line interval and is inactive during the second half. Bandlimiting filter 14 only operates during one half of the horizontal line interval because only one half of the original input signal is present, following decimation. Interpolating filter 18, too, only operates during one half of the horizontal line interval. In the third horizontal line interval decimating filter 12 decimates the third line of input data while bandlimiting filter 14 limits the band width of the second line during half of the horizontal line interval. Interpolating filter 18 interpolates the second line of input data during half of the horizontal line interval. A similar set of operations takes place during the fourth and subsequent horizontal line intervals.

It is also possible to run the filter at different clock rates. For example, decimating filter 12 can operate at a first-clock-rate while bandlimiting filter 14 operates at half the clock rate of decimating filter 12. In the way, FIFO 22 is written to at a fast rate and read from at a slower rate. If decimating filter 12 is holding the data, then the data flow would appear constant (i.e. no period of inactivity).

Figure 3:
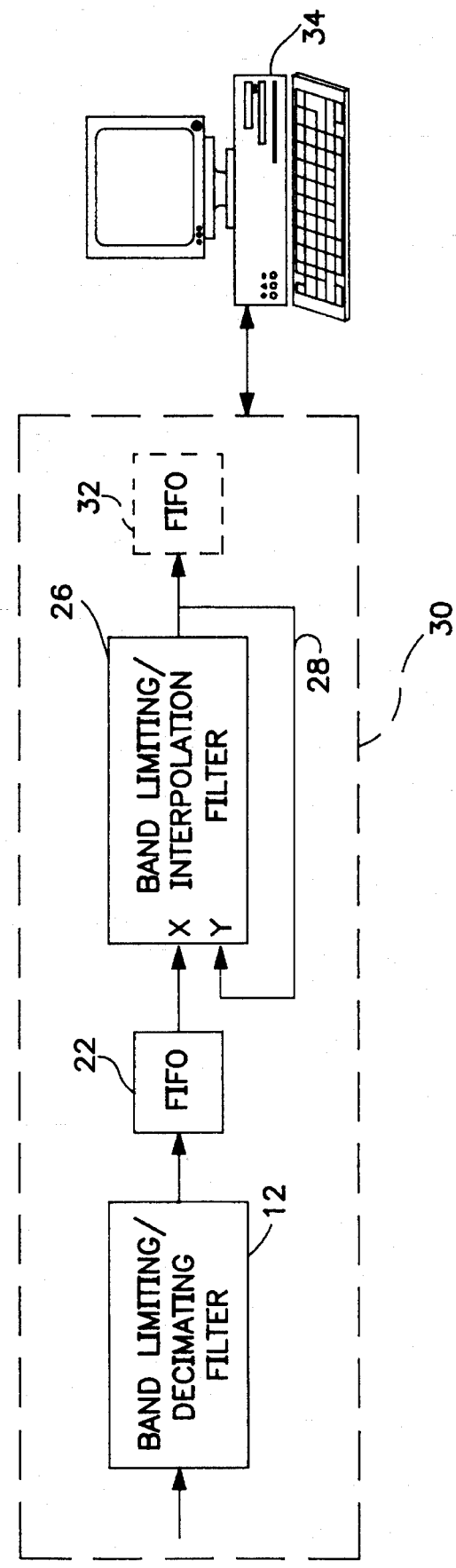
FIG. 3 is block diagram of an alternate embodiment of the video resizing system shown in FIG. 2 wherein the decimating filter also comprises bandlimiting capability and bandlimiting filter and interpolating filter are contained in a single block with a feedback loop.

FIG. 3 shows a video resizing system 30. Video resizing system 30 is an additional embodiment of the present invention wherein decimating filter 12 also includes bandlimiting capability and bandlimiting filter 14 and interpolating filter 18 are combined in a single semi-conductor chip 26. A feedback path 28 returns data following bandlimiting operation to an input Y to carry out the interpolation operation. An additional FIFO 32 can operate following interpolation in interpolation circuit 26. FIFO 32 would be loaded with data corresponding to the interpolation taking place.

A computer 34 is shown connected to system 30 for control of the filters contained in system 30. Computer 34 is comprised of a microprocessor, a keyboard, a display, a storage device and input/output (I/O) hardware for connection to system 30.

Figure 5A:
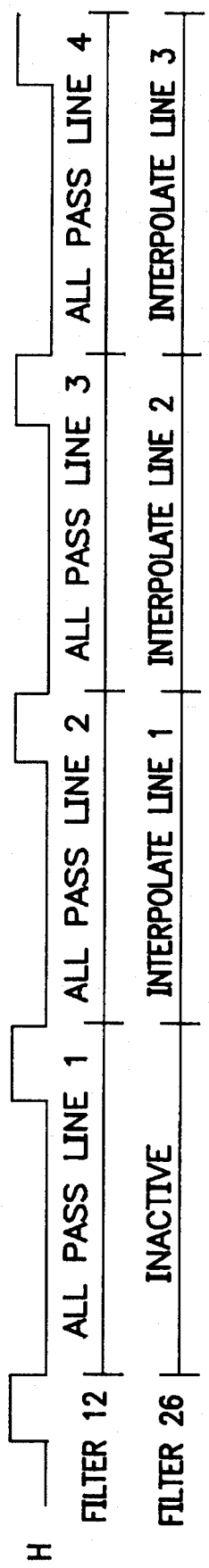
FIGS. 5A, 5B and 5C are timing diagrams which are useful for describing the operation of the exemplary embodiment of the present invention shown in FIG. 3.
Figure 5B:
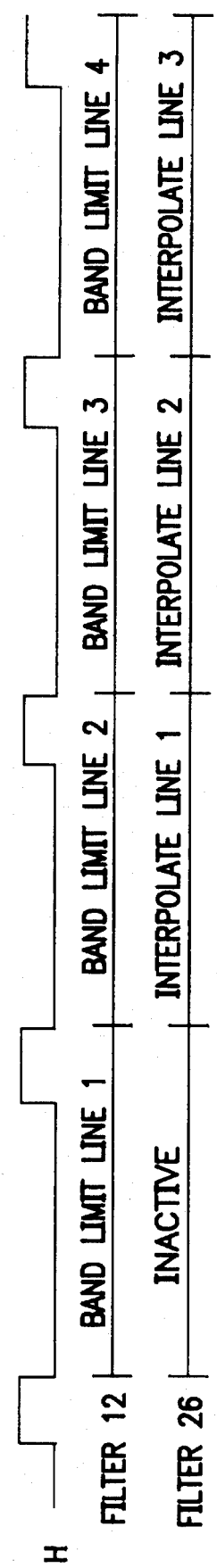
Figure 5C:
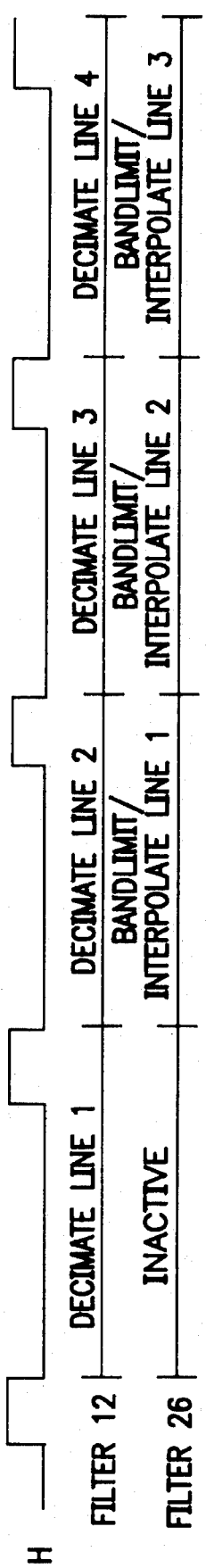

FIGS. 5A, 5B and 5C illustrate the upsampling mode, downsampling mode and decimating mode operation of system 30. In FIG. 5A, decimating filter 12 acts as an all pass filter for all horizontal lines of the image. Bandlimiting/interpolating filter 26 is inactive during the first horizontal line interval. During the second and subsequent line intervals, filter 26 interpolates the previous line which passed through filter 12.

FIG. 5B illustrates the downsampling mode operation of system 30. In downsampling mode, filter 12 acts as a bandlimiting filter during each horizontal line interval. During the first horizontal line interval, filter 26 is inactive. During the second and subsequent line intervals, filter 26 interpolates the previous input line which has undergone bandlimiting during the previous line interval.

In FIG. 5C, the decimating mode operation of system 30 is illustrated. During each horizontal line interval, filter 12 decimates the current input line. During the first line interval, filter 26 is inactive. During the second and subsequent line intervals, filter 26 carries out both a bandlimiting operation of the signal which was decimated in the previous line interval. During the second half of the line interval, filter 26 carries out its interpolation operation.

Bandlimiting/interpolation filter 26 is a Gennum GF90101 filter in an exemplary embodiment of the present invention. This filter is a multi phase FIR filtering chip capable of both interpolation and simple FIR filtering. The chip has a dual input port multiplexing capability which allows for two concurrent filtering operations (i.e. decimating mode). In decimating mode, decimating filter 12 of system 30 decimates the input data, leaving less than half of the input data to be passed to bandlimiting/interpolation filter 26. Filter 26 thus has enough time to carry out its bandlimiting operation and its interpolation operation, concurrently.

Both decimating filter 12 and bandlimiting/interpolation filter 26 of system 30 contain separate memory banks of selectable filter coefficients in an exemplary embodiment of the present invention. Decimating filter 12 has a memory consisting of 32 locations of 8 taps each. Memory location 0219 contains the taps for the decimating filters while locations 20–31 contain the taps for the bandlimiting filters. Using the Harris semi-conductor chip in an exemplary embodiment, filter 12 is able to utilize a fold over filter architecture. Although consisting of only 8 taps, it is capable of implementing a 15 tap filter. Thus, the tap values that are stored in memory represent only half of the complete filter (this limits this use of the Harris IC to devices in which symmetric filters may be used).

The filter length that is used for decimating mode is longer than for simple FIR filters. For example, when decimating by a factor of 2, a 31 tap filter is used. This requires 2 separate memory locations for each tap. When decimating by a factor of 4, a 63 tap filter is used, requiring 4 separate memory locations for each tap. If decimating by a factor of eight, a 127 tap filter is used with eight memory locations per tap.

TABLE 1

Memory Contents of Decimating Filter 12 for System 30

| Location(s) | Filter |
|---|---|
| 0, 1 | Horizontal 2:1 decimation |
| 2, 3 | Vertical 2:1 decimation |
| 4, 5, 6, 7 | Horizontal 4:1 decimation |
| 8, 9, 10, 11 | Vertical 4:1 decimation |
| 12 to 19 | Horizontal and Vertical 8:1 decimation |
| 20 | Horizontal Bandlimiting Filter #2 |
| 21 | Horizontal Bandlimiting Filter #3 |

TABLE 1-continued

Memory Contents of Decimating Filter 12 for System 30

| Location(s) | Filter |
|---|---|
| 22 | Horizontal Bandlimiting Filter #4 |
| 23 | Horizontal Bandlimiting Filter #5 |
| 24 | Horizontal Bandlimiting Filter #6 |
| 25 | Vertical Bandlimiting Filter #2 |
| 26 | Vertical Bandlimiting Filter #3 |
| 27 | Vertical Bandlimiting Filter #4 |
| 28 | Vertical Bandlimiting Filter #5 |
| 29 | Vertical Bandlimiting Filter #6 |
| 30 | Horizontal Bandlimiting Filter #1 |
| 31 | Vertical Bandlimiting Filter #1 |

The memory for bandlimiting/interpolation filter 26 in an exemplary embodiment using the Gennum GF9101 chip has a capacity of 108 locations of 12 taps per location. Memory location 0–95 contain interpolation filters which cannot be modified with software. The bandlimiting filters that are used in the decimating mode are held in locations 96–107. The following table is a listing of the memory contents of bandlimiting/interpolation filter 26.

TABLE 2

Memory Contents of Bandlimiting/Interpolation 26 Filter of System 30

| Location(s) | Filter |
|---|---|
| 0 to 95 | Interpolation Filters |
| 96 | Horizontal Bandlimiting Filter #1 |
| 97 | Horizontal Bandlimiting Filter #2 |
| 98 | Horizontal Bandlimiting Filter #3 |
| 99 | Horizontal Bandlimiting Filter #4 |
| 100 | Horizontal Bandlimiting Filter #5 |
| 101 | Horizontal Bandlimiting Filter #6 |
| 102 | Vertical Bandlimiting Filter #1 |
| 103 | Vertical Bandlimiting Filter #2 |
| 104 | Vertical Bandlimiting Filter #3 |
| 105 | Vertical Bandlimiting Filter #4 |
| 106 | Vertical Bandlimiting Filter #5 |
| 107 | Vertical Bandlimiting Filter #6 |

In an exemplary embodiment, the operational modes of system 30 have been divided over six different filter characteristics. These filter characteristics are shown in the following table.

TABLE 3

Filter Selection Table for System 30

| Scaling Factor | Bandlimiting Filter |
|---|---|
| >= 1.0 | Horizontal/vertical Filter #1 |
| <= 1.0 and > 11/12 | Horizontal/Vertical Filter #2 |
| <= 1/12 and > 5/6 | Horizontal/Vertical Filter #3 |
| <= 5/6 and > 3/4 | Horizontal/Vertical Filter #4 |
| <= 3/4 and > 2/3 | Horizontal/Vertical Filter #5 |
| <= 2/3 and > 0.5 | Horizontal/Vertical Filter #6 |

For example, if the number of active input samples is 1920 (i.e. for interlaced HDTV) and the number of active output samples desired is 1280 (i.e. for progressive HDTV) the scaling factor is calculated as 1280÷1920=⅔. From the above table it is seen that this conversion requires Horizontal/Vertical Filter #6 as the bandlimiting filter portion of decimating filter 12 of system 30.

When operating in decimating mode, filter 12 decimates by a factor of 2 when the scaling factor is >0.25 and <=0.5. When the scaling factor is >0.125 and <=0.25, decimating filter 12 decimates by a factor of 4. Finally, when the scaling factor is less than or equal to 0.125, decimating filter 12 decimates by a factor of 8.

When operating in decimating mode, bandlimiting/interpolation filter 26 operates in its bandlimiting mode. The particular bandlimiting filter to be used is selected taking into account any decimating which takes place prior to bandlimiting. For example, coming from high definition television to standard definition television, the scaling factor is 720÷1920=0.375. Since the scaling factor is <0.5 system 30 operates in decimating mode. Once decimating filter 12 decimates the input samples by a factor of 2, 960 samples are provided, first to FIFO 22 and then to bandlimiting interpolation filter 26. Filter 26 bandlimits the signal resolution from 960 samples to 720 samples. The scaling factor for filter B then becomes 720÷960=0.75. Using the above table, a scaling factor of 0.75 results in the use of bandlimiting filter #5 of filter 26. Thus, the scaling factor for decimating filter 12 is different than that of bandlimiting/interpolation filter 26.

Figure 6A:
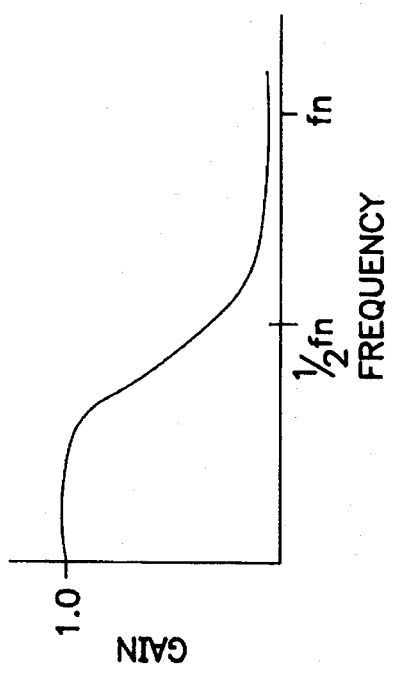
FIGS. 6A, 6B and 6C are frequency response curves for three different decimating filters, which decimates by factors of 2, 4 and 8 respectively.
Figure 6B:
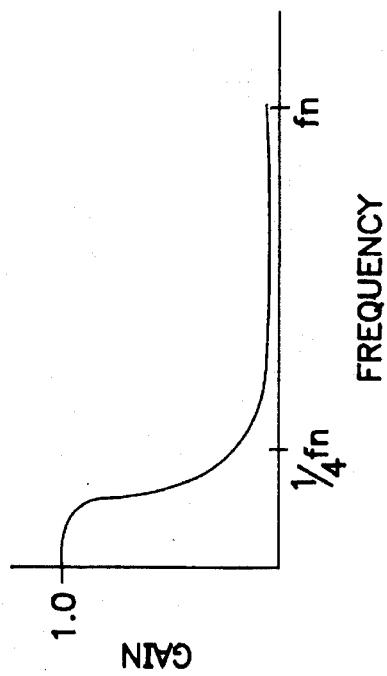
Figure 6C:
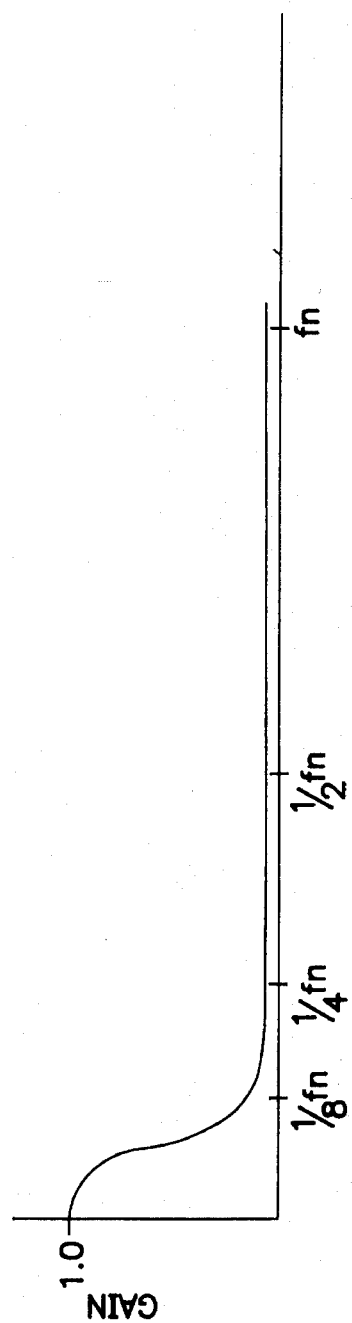

There shown is in FIGS. 6A, 6B and 6C example filter response graphs for decimating filter 12 shown in system 30. In each of these figures, $f_n$ equals a Nyquist frequency. FIG. 6A shows the filter response during a 2:1 decimation. FIG. 6B shows a filter response during a 4:1 decimation. FIG. 6C shows a filter response during an 8:1 decimation.

There is shown in FIG. 7A–7F example filter response graphs illustrating bandlimiting filter 26 used in system 30. FIGS. 7A–7F correspond to filters 1 through 6 listed in the table 3 described above.

Figure 7A:
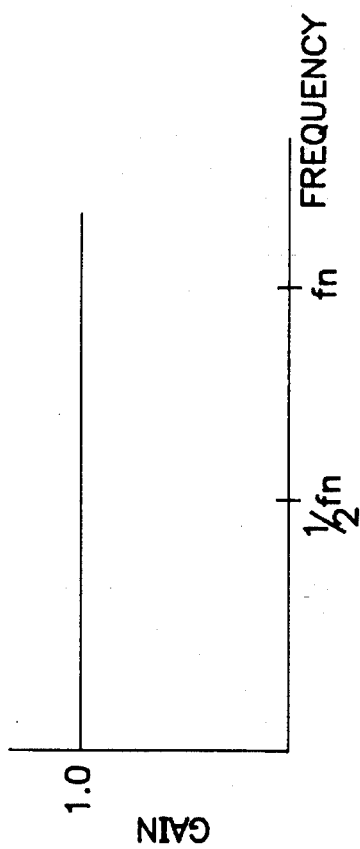
FIGS. 7A, 7B, 7C, 7D, 7E and 7F are frequency response curves corresponding to various scaling factors in the operation of the exemplary embodiment of the present invention shown in FIG. 3.
Figure 7B:
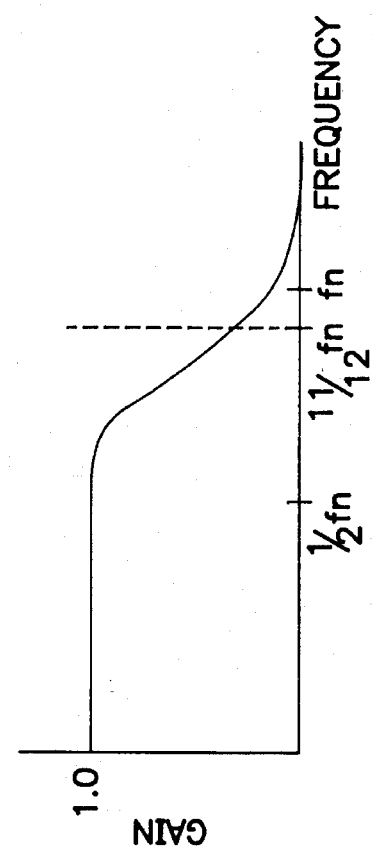
Figure 7C:
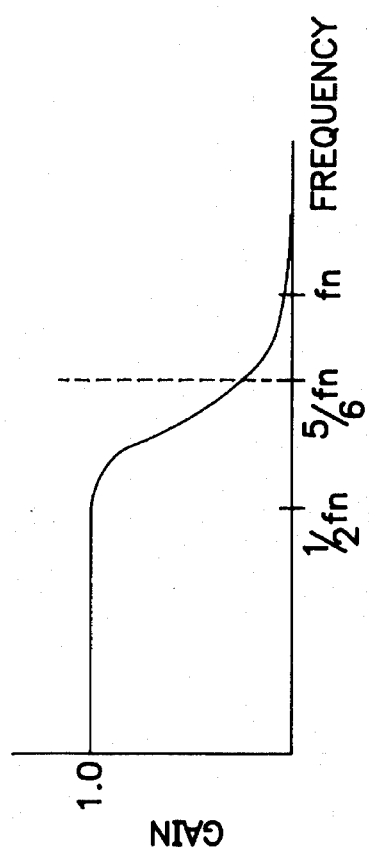
Figure 7D:
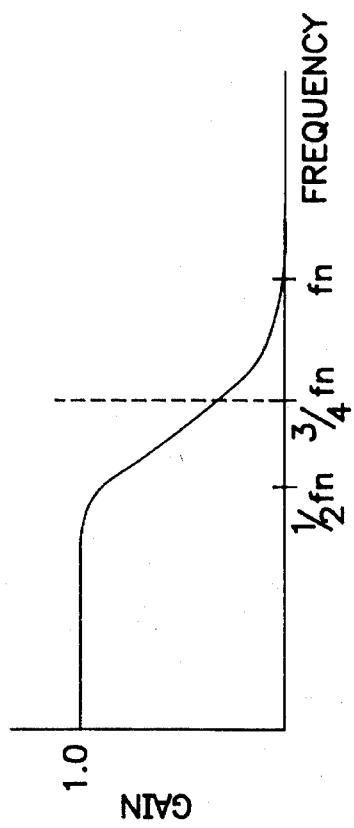
Figure 7E:
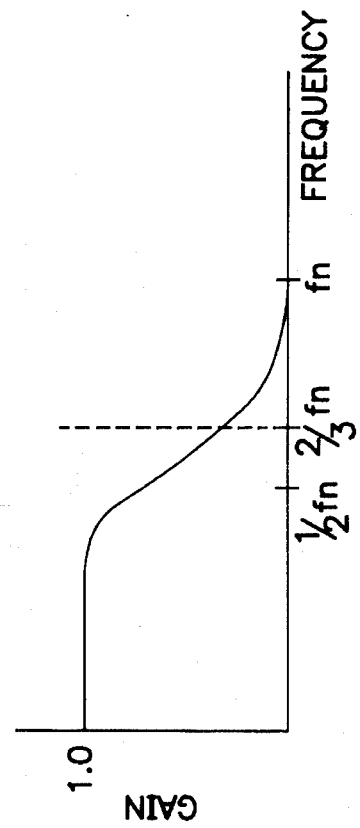
Figure 7F:
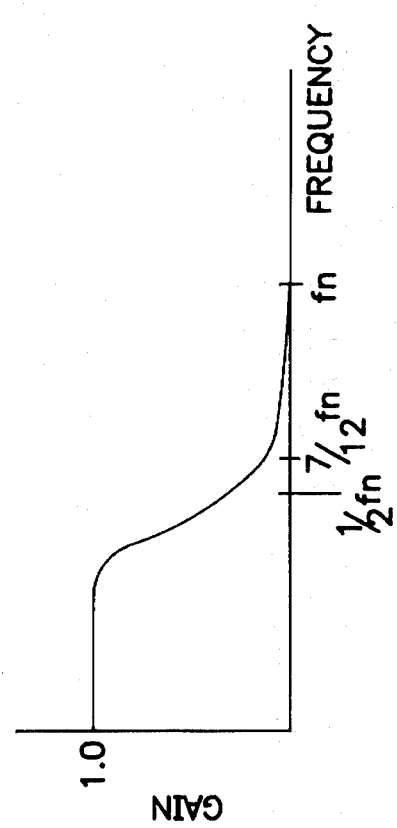

For example, referring to FIG. 7A, a scaling factor of greater than or equal to 1 results in the all-pass frequency response characteristics shown in FIG. 7A when using horizontal/vertical filter no. 1. Similarly, referring to FIG. 7B, there is shown a filter response characteristic when the scaling factor is less than or equal to 1.0 and greater than 11/12 using a horizontal/vertical filter no. 2. The remaining FIGS. 7C–7F correspond to frequency characteristics on horizontal/vertical filters no. 3–6 are used, respectively.

When dealing with an SDTV interlaced output, the active vertical size is equal to the number of active lines in the full frame. When converting to an SDTV interlace format a video resizing system, such as system 30 generates a progressive (non-interlaced) output. Additional output processors (not shown) then drops every other line to produce an interlaced format output signal.

In operation, the filters listed in tables 1 and 2 are contained in a computer file stored in computer 34 (FIG. 3). This file may be contained, for example, in a storage device such as a hard disk drive of personal computer 34. Storage means other than a hard disk drive and processor means other than a personal computer can be used for these purposes as will be understood by those skilled in the art. The format controller which operates a video resizing system, such as system 30, uses this file in constructing the necessary filter coefficients to carry out a desired format conversion. In an exemplary embodiment, a separate computer program stored in computer 34 is used to build a second computer file from the filter information contained in the first computer file. The second computer file is in a form suitable for use by system 30.

In an alternate embodiment, a user can provide filter coefficients such as the filter coefficients in the format shown in table 4. Providing filter coefficients in this way, allows the generation of filter characteristics having frequency response curves different than those shown in FIGS. 6A–6C and 7A–7F.

TABLE 4

| | Input File Format | |
|---|---|---|
| Filter (one per line) | Y/C | # of taps |
| Filter A Horizontal 2:1 Decimation Filter | Y | 16 |
| Filter A Vertical 2:1 Decimation Filter | Y | 16 |
| Filter A Horizontal Bandlimiting Filter | Y | 8 |
| Filter A Vertical Bandlimiting Filter | Y | 8 |
| Filter B Horizontal Bandlimiting Filter | Y | 6 |
| Filter B Vertical Bandlimiting Filter | Y | 6 |
| Filter A Horizontal 2:1 Decimation Filter | C | 16 |
| Filter A Vertical 2:1 Decimation Filter | C | 16 |
| Filter A Horizontal Bandlimiting Filter | C | 8 |
| Filter A Vertical Bandlimiting Filter | C | 8 |
| Filter B Horizontal Bandlimiting Filter | C | 6 |
| Filter B Vertical Bandlimiting Filter | C | 6 |

Table 4 shows the order in which the filters used in an exemplary embodiment appear in the input file provided by a user. The exemplary format uses a separate set of filter coefficients for luminance (Y) and chrominance (C). Thus, the C filter immediately follows the Y filters with the identical format.

The following are additional examples of the operation of an exemplary conversion using system 30. The first example is converting 1125 lines interlaced to format 525 lines progressive format. For this conversion, the horizontal dimension components are downsampled from 1920 samples per line to 720 samples per line while the vertical dimension components are downsampled from 518 samples per column to 484 samples per column. The first step in the conversion is determining which filters will be used for the video resizing.

For the horizontal resizing, the scaling factor is determined to be 720÷1920=0.375. Accordingly, decimating filter 12 will be operating in decimate mode (mode 3) using a decimating factor of 2. The scaling factor for bandlimiting/ interpolation filter 26 is different than the scaling factor for decimating filter 12. The scaling factor for filter 26 is 720÷960=0.75. The difference is a result of filter 26 having an input of 960 which is the original input of 1920 decimated by a factor of 2. In this mode, the necessary filters for the conversion are the horizontal 2:1 decimating filter for decimating filter 12 and the horizontal/bandlimiting filter for filter 26. When designing the bandlimiting response for filter 26, filter 26 should bandlimit to less than 0.75 of the Nyquist frequency.

For vertical dimension conversion, the scaling factor is 484÷518=0.934. Accordingly, decimating filter 12 operates in bandlimiting mode. In this mode the filter used is the vertical bandlimiting filter for decimating filter 12. The bandlimiting filter of filter 26 is not necessary in this mode.

The second example involves a conversion of 1125 lines interlaced format to 525 lines interlaced format. For this conversion, the horizontal dimension components are downsampled from 1920 samples per line to 720 samples per line while the vertical dimension components are downsampled from 518 samples per column to 484 samples per column. The actual number of columns per field that are generated as the output is 242. 484 vertical columns per frame is required because system 30 generates a progressive output (non-interlaced). As previously described, to generate an interlaced output using the present invention, every other line is discarded.

For this second example, the filters of interest are identical to those described for the previous example (1125 interlace to 525 progressive).

For the third conversion, a 525 sample per line progressive format is converted to 1125 samples per line interlaced format. For this conversion, the horizontal dimension is upsampled from 720 samples per line to 1920 samples per line while the vertical dimension is upsampled from 484 sample per column to 518 samples per column. The scaling factor for the horizontal conversion is 1920÷720=2.667. Accordingly, decimating filter 12 operates in bandlimiting mode while bandlimiting/interpolating filter 26 does not carry out any bandlimiting function. For the vertical conversion, the scaling factor is 518÷484=1.07. In this mode, decimating filter 12 operates in bandlimiting mode while filter 26 does not carry out any bandlimiting operation. For this example, the horizontal and vertical decimating filter 12 bandlimiting filters are used. Since upsampling is being performed in both the horizontal and vertical dimensions, a bandlimiting operation is not needed. Accordingly, an all pass filter can be entered into the input file.

Figure 8:
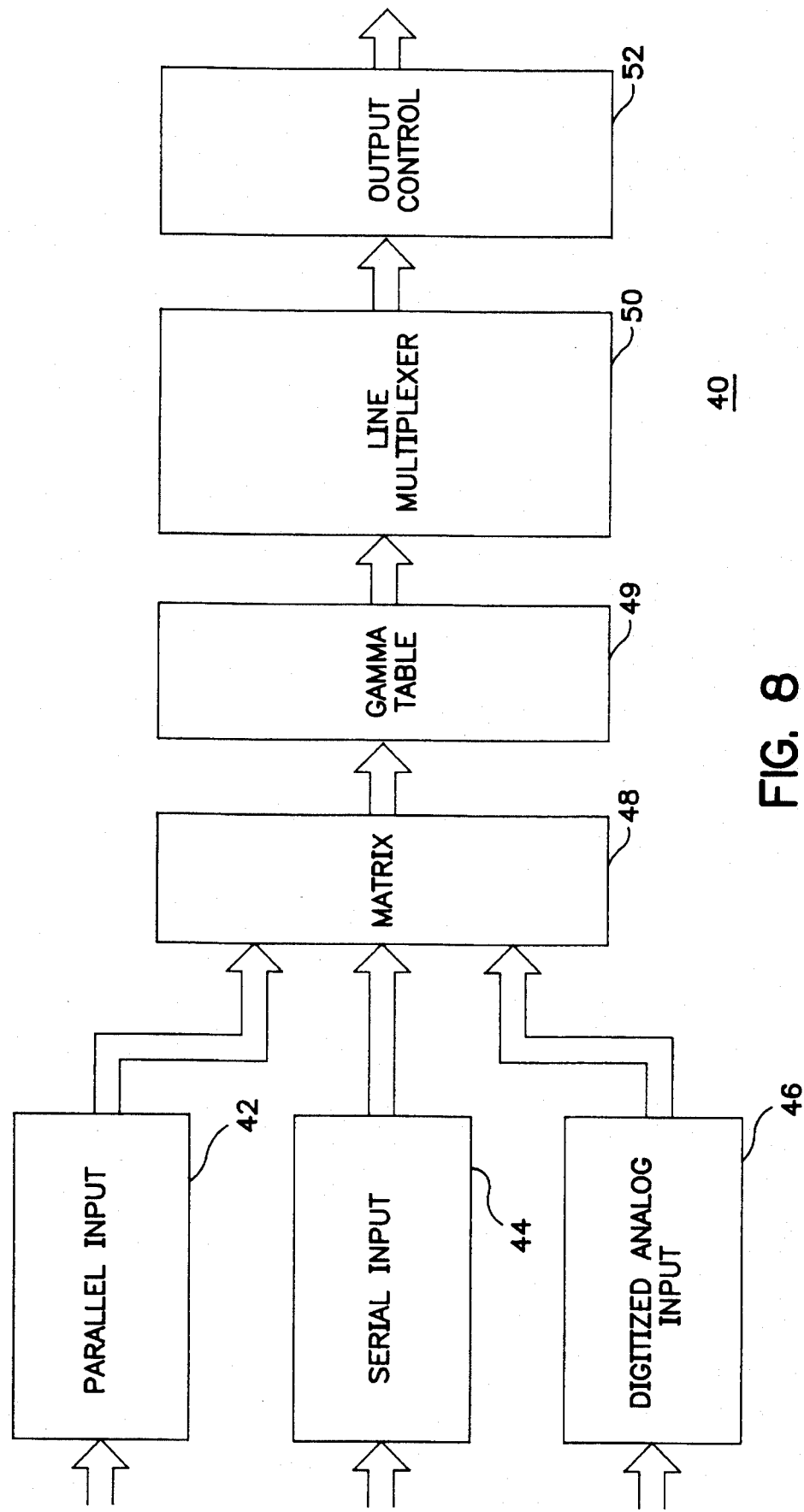
FIG. 8 is a block diagram of an input processor for a video resizing system in accordance with an exemplary embodiment of the present invention.
Figure 9:
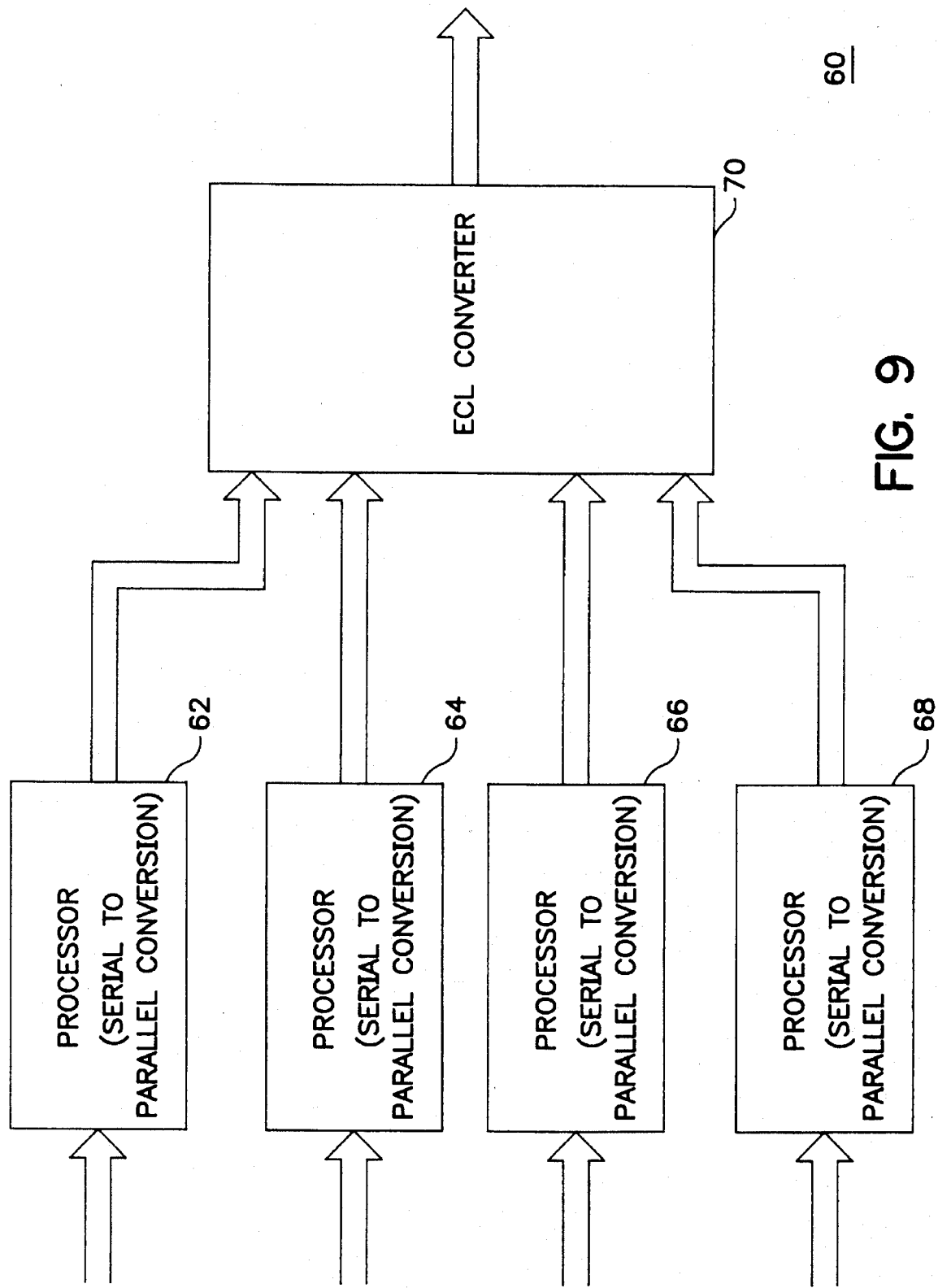
FIG. 9 is a block diagram of an output processor for a video resizing system in accordance with an exemplary embodiment of the present invention and FIG. 10 is a flow chart showing a method of operation of an exemplary embodiment of the present invention.

In an exemplary embodiment, system 30 has a digital input processing front end and a digital output processing back end shown in FIGS. 8 and 9 respectively.

Digital input processor 40 includes a parallel input block 42 for inputting signals through a parallel connection. For example, an HDTV source signal can be received in parallel form. Digital input processor 40 also contains a serial input section for receiving a digital serial input such as an SDTV video signal at 270 Mbps or a wide screen standard definition TV (WSDTV) video signal at 360 Mbps or an enhanced definition TV (EDTV) video signal. In parallel input block 42, ECL signals are translated to TTL level for processing. In an exemplary embodiment, serial digital input block 44 uses a Gennum serial receiver GS9005, automatic tuning subsystem (GS9010) and decoder (GS9000) to receive serial input signals. Depending upon the input signal, one or two serial links are used by serial digital input block 44. Digitized analog input block 46 is used to receive digitized analog signals from a digital-to-analog conversion board. This is necessary as an analog HDTV or analog EDTV input signal, for example, is used. Digitized analog input block 46 uses a Gennum decoder (GD9000) in an exemplary embodiment. After input into digital input board 40, the various components of the input signal are processed in matrix blocks 48 and gamma table block 49. Matrix block 48 is used to convert RGB sources to luminance, alters (R-Y) and (B-Y) color difference signal (YCrCb) form used when processing signals in an exemplary embodiment of the present invention. Gamma table 49 may be used for non-linear processing such as changing the gamma curve of an output video. Gamma table 49 may also be used to change the black level of the output video by adding or subtracting a fixed offset into the luminance signal.

Signal processing continues at Line Multiplexer (MUX) block 50 where luminance and chrominance signals are reformatted for parallel processing. Line MUX 50 splits the even and odd luminance signals into four sets of line FIFOs with each FIFO having a complete luminance line. Finally, output control block 52 is used to select input signal sources using timeance reference signal to control writing of active data into the FIFOs of line MUX block 50. Output control 52 outputs signal for processing in system 30 through Gennum encoders (GS90002).

There shown in FIG. 9 a block diagram of digital output processor 60. Digital output processor 60 takes converted output signals from system 30 for output to a device such as an HDTV set or SDTV set. Digital output processor 60 uses a corresponding number of processing blocks for the number of output lines output by system 30. In this example, four processing blocks 62, 64, 66 and 68 are shown. Processing block 62-68 convert the serial input data stream to a parallel package using Gennum decoders (GS9000). Various component signals are extracted from the parallel video data signal before being output to ECL section 70. ECL section 70 converts the TTL signal output from processing block 62-68 to ECL signals. ECL convertor block 70 then outputs signals for display on an appropriate display device.

Figure 10:
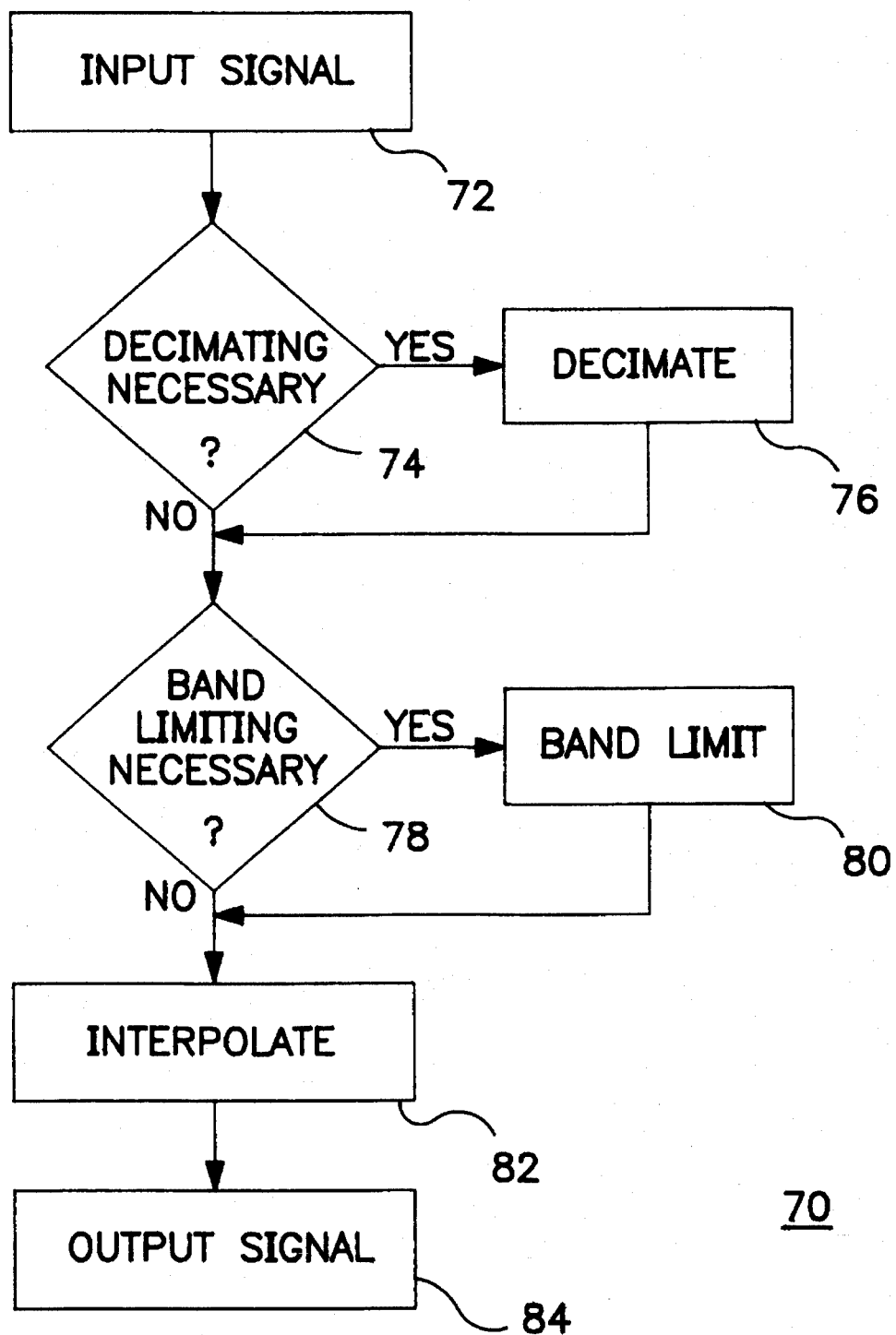

There is shown in FIG. 10 is a flowchart of showing a method of operation of an exemplary embodiment of the present invention. The operation sequences of the exemplary embodiment of system 30 shown in FIG. 3.

A signal is input in block 72. Following the determination of whether decimation is necessary depends upon the difference between the sample resolution of the input signal and that of the ultimate output signal. If decimation is necessary, decimating takes place in block 76. If not, a determination is made in block 78 whether bandlimiting is necessary. The bandlimiting step depends upon the bandwidth of the signal prior to interpolation. If bandlimiting is necessary, bandlimiting takes place as indicated in block 80. The next step is interpolation at block 82. Interpolation will produce the output signal as shown in block 84. Additional steps can be added to this general method as indicated with respect to the operation of systems 10, 20 and 30, previously described.

The present invention can also be used to provide zoom and pan effects to the output image. In an exemplary embodiment, the zoom and pan calculations are made on a computer or imbedded controller, such as personal computer 34 shown in FIG. 3 and downloaded for resampling by system 30. Zoom and/or pan information can be interactively changed by a user through an interface routine, such as the WINDOWS™ graphic user interface. The zoom and pan information entered by the user, combined with the input and output format dimensions, also provided by the user contain the information necessary to calculate the parameters for zoom and/or pan effects carried out by system 30.

Table 5 lists parameters relevant to zoom and pan effects.

TABLE 5

Zoom and Pan Information

| Parameter | Description |
|---|---|
| Hin | Input horizontal dimension size (pixels) |
| Vin | Input vertical dimension size (pixels) |
| Hout | Output horizontal dimension size (pixels) |
| Vout | Output vertical dimension size (pixels) |
| zoom | zoom factor (real number ratio) |
| strx | horizontal stretch factor (real number ratio) |
| stry | vertical stretch factor (real number ratio) |
| dx | horizontal offset (pixels) |
| dy | vertical offset (pixels) |

The zoom factor is entered by a user and corresponds to the zoom factor for the conversion. For example, a zoom factor of 2 provides a 2:1 zoom. The strx and stry parameters determine the amount that the zoom factor differs from the scaling factor. The scaling factor is the ratio of the output sample format to the input sample format. Accordingly, the horizontal and vertical scaling factors will be different for conversions between formats of different pixel aspect ratios. The separate horizontal and vertical scaling factors are referred to a zx (horizontal) and zy (vertical). The dx and dy parameters are values used with respect to the pan effect. These parameters determine the amount at the center of the input picture deviates from center of the output picture after the conversion from the input sample format to the output sample format.

In an exemplary embodiment, using bandlimiting/interpolation filter 26 shown in FIG. 3, there are 96 phases in this filter. Therefore, the scaling factors must be configured appropriately.

The horizontal and vertical scaling factors (zx and zy) must preserve the pixel aspect ratio (PAR) for the input and output sampling formats, respectively. The PAR is the ratio, in distance, between the horizontal and vertical dimensions between each pixel and is calculated by equation 1.

$$PAR = (y\ dimension/x\ dimension) * SAR, \quad (1)$$

where SAR=Screen Aspect Ratio x dimension=number of active pixels in one line, and y dimension=number of active lines in full frame This ratio must hold in any conversion that preserves both the aspect ratio (SAR) of the input format and the pixel ratio (PAR) that is, $$(y\ dimension_{new}/x\ dimension_{new}) * SAR_{in} =$$
$$(y\ dimension_{out}/x\ dimension_{out}) * SAR_{out} \quad (2)$$

where the $_{in}$ subscript represents parameters for the input format, the $_{out}$ subscript represents parameters for the output format, and the $_{new}$ subscript represents parameters for the covered output This relationship is used to determine the zx and zy values that are needed to preserve the aspect ratios. That is, zx and zy are not independent. In an exemplary embodiment zx is allowed to vary and zy is calculated from zx.

$$y\ dimension_{new} = (SAR_{out}/SAR_{in}) *$$
$$(y\ dimension_{out}/x\ dimension_{out}) * x\ dimension_{new} \quad (3)$$

Since zy is represented as a ratio between the new vertical dimension and the input vertical dimension. Equation (3) can be rearranged, resulting in equation (4).

$$zy = (y\ dimension_{new}/y\ dimension_{in}) =$$
$$(SAR_{out}/SAR_{in}) * (y\ dimension_{out}/x\ dimension_{out}) *$$
$$(x\ dimension_{new}/y\ dimension_{in}) \quad (4)$$

Since h dimension$_{new}$=h dimension$_{in}$*zx, equation (4) reduces to, $$zy = (SAR_{out}/SAR_{in}) *$$
$$(y\ dimension_{out}/x\ dimension_{out}) *$$
$$(x\ dimension_{in}/y\ dimension_{in}) * zx \quad (5)$$

Equation (5) shows the relationship between zx and zy. Therefore, while the user interactively varies the zoom (from above) factor, the equation is calculated to preserve the aspect ratios (PAR and SAR). That is, zx takes its value from the zoom value and zy is determined from equation (5).

Although it is usually desired to preserve the pixel aspect ratio the present invention can provide flexibility to change the PAR. To facilitate this, the strx and stry factors are used. These factors enable the user to change the scaling of a single dimension independent of the other. Accordingly, the user has three degrees of freedom for scaling which are represented by zoom, strx and stry. Two additional parameters zx* and zy* represent the horizontal and vertical scaling factors, respectively, after adjustments for strx and stry.

$$zx^* = zx^* strx$$
$$zy^* = zy^* stry \qquad (6)$$

If strx and stry are both equal to 1.0, from (6), $zx^* = zx$, $zy^* = zy$, and the aspect ratios will automatically be preserved.

For user convenience, certain precalculated sets of parameters can be introduced for each conversion and are listed below.

| Mode | Conversion Description |
|---|---|
| Fit H | input horizontal samples are resampled to fit the output |
| Fit V | input vertical samples are resampled to fit the output |
| Fit H + V | input frame/field is resampled to fit the output in both dimensions |

In the "Fit H" mode above, the active input horizontal samples are resampled to fit the full range of the output format. Thus, the zx parameter is calculated from a ratio of the number of active input and output horizontal samples. That is, $$zx = (x\ dimension_{out}/x\ dimension_{in}) \qquad (7)$$

In this mode, each output horizontal line will be filled with the samples lines from the input. The vertical scaling factor zy is calculated from 95) for aspect ratio preservation.

For the "Fit V" mode, the active input vertical lines are resampled to fit the full range of the output format. Therefore, the zy parameter is calculated from a ratio of the number of active input and output vertical lines. That is, $$zy = (y\ dimension_{out}/y\ dimension_{in}) \qquad (8)$$

However, all previous calculations involved choosing a value for zx and deriving zy from it. In order to yield a desired value for zy when plugging it into equation (5), an expression for zx is needed.

From equation (1), $$x\ dimension_{new} = (SAR_{in}/SAR_{out})$$
$$(x\ dimension_{out}/y\ dimension_{out})\ y\ dimension_{new} \qquad (9)$$

Dividing both sides by $x\ dimension_{in}$ yields, $$(x\ dimension_{new}/x\ dimension_{in}) = (SAR_{in}/SAR_{out})$$
$$(x\ dimension_{out}/y\ dimension_{out})$$
$$(y\ dimension_{new}/x\ dimension_{in}) \qquad (10)$$

But $y\ dimension_{new} = zy\ x\ dimension_{in}$, so, $$zx = (SAR_{in}/SAR_{out})\ (x\ dimension_{out}/x\ dimension_{in}) \qquad (11)$$

The final mode, "Fit H+V" requires that the four corners of the input be mapped directly to the four corners of the output. This could potentially result in an aspect ratio mismatch (strx<>1.0 or stry<>1.0). In order to generate the necessary factors, equation (7) is used to calculate the horizontal scaling factor zx, while zy can be automatically calculated from (5). Equation 12 is used to find a value for stry that will produce a scaling factor zy* to fit the number of active input lines to the number of active output lines. That is, $$zy^* = stry^* zy = (y\ dimension_{out}/y\ dimension_{in}) \qquad (12)$$

The desired value for stry is then obtained from equation (12), $$stry = (y\ dimension_{out}/y\ dimension_{in})/zy \qquad (13)$$

Combining equations (5), (7), and (13), $$stry = (y\ dimension_{out}/y\ dimension_{in})\ (SAR_{in}/SAR_{out})$$
$$(x\ dimension_{out}/y\ dimension_{out})$$
$$(y\ dimension_{in}/x\ dimension_{in})$$
$$(x\ dimension_{in}/x\ dimension_{out}) \qquad (14)$$

Which reduces to, $$stry = (SAR_{in}/SAR_{out}) \qquad (15)$$

In addition to the modes listed in Table 5, an exemplary user interface using WINDOWS™ may include an additional button labelled, "Default". This selection chooses either the "Fit H" or "Fit V" mode depending of the type of conversion. The purpose of this "Default" setting is to find the best fit based on the aspect ratio differences. This "best fit" will be chosen to preserve all of the input picture on the output. So, for example, in 16:9 to 4:3 conversion, the "Fit H" mode can be used to produce a letterbox output. For 4:3 to 16:9 conversion, the "Fit V" mode is chosen. For conversions that do not change aspect ratio, the "Fit H" and "Fit V" modes are identical.

While particular embodiments of the present invention are disclosed herein, it is not intended to limit the invention to such disclosure, and changes and modifications may be incorporated and embodied within the scope of the following claims.

What is claimed:

1. A video format converter for converting a first digital input signal having a first sample size per unit length and a first bandwidth, to a digital output signal having a second sample size per unit length, comprising:

a) first filter means responsive to a first control signal for selectively decimating said first digital input signal to a smaller sample size and outputting a decimated signal;

b) second filter means responsive to a second control signal for selectively limiting the bandwidth of said decimated signal and outputting a bandlimited signal;

c) third filter means for interpolating and up sampling said bandlimited signal to produce said digital output signal; and d) control means responsive to said first and second sample size per unit length values for generating said first, second and third controls signals.

2. A video format converter in accordance with claim 1 wherein said first filter means acts as an all pass filter and said decimated signal is equivalent to said first input signal.

3. A video format converter in accordance with claim 1 wherein said second filter means acts as an all pass filter and said bandlimited signal is equivalent to said decimated signal.

4. A video format converter in accordance with claim 1 wherein said second filter means and said third filter means comprise a semiconductor chip which operates as said first filter means during a first clock cycle and operates as said third filter means during a second clock cycle.

5. A video format converter in accordance with claim 1 further comprising processor means for programming one or more of said first, second and third filter means.

6. A video format converter in accordance with claim 1 further comprising first memory means for storing said decimated signal prior to limiting the bandwidth by said second filter means.

7. A video format converter in accordance with claim 1 further comprising second memory means for storing said bandlimited signal prior to conversion by said third filter means.

8. A video format converter in accordance with claim 1 wherein said third filter means interpolates said bandlimiting filter output signal to produce said digital output signal.

9. A method for converting a first digital input signal having a first sample size per unit length and a first bandwidth, to a digital output signal having a second sample size per unit length, comprising the steps of:

a) decimating said first digital input signal to a smaller sample size in response to a first control signal and outputting a decimated signal;

b) limiting the bandwidth of said decimated signal in response to a second control signal and outputting a bandlimited signal; and c) interpolating and up sampling said bandlimited signal in response to a third control signal to produce said digital output signal.

* * * * *